W. J. RICHARDSON & E. DAUPHINOT.
Funnel-Strainers.
No. 155,386. Patented Sept. 29, 1874.
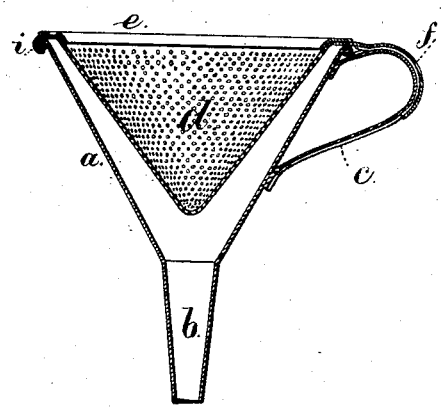
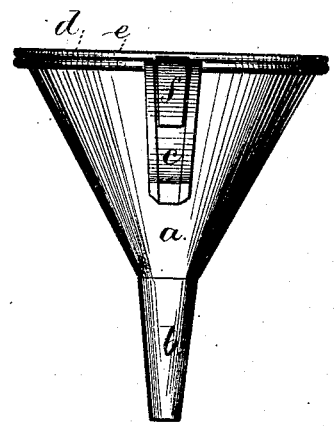
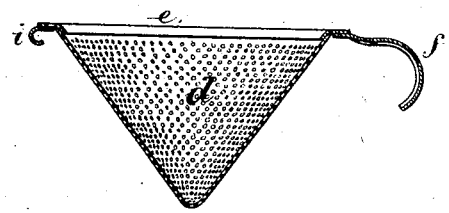
Witnesses,
Chas. H. Smith
Harold Serrell
Inventors
William J. Richardson
Emile Dauphinot
per Lemuel W. Serrell
Atty.

UNITED STATES PATENT OFFICE.

WILLIAM J. RICHARDSON AND EMILE DAUPHINOT, OF BROOKLYN, N. Y.

IMPROVEMENT IN FUNNEL-STRAINERS.

Specification forming part of Letters Patent No. 155,386, dated September 29, 1874; application filed August 25, 1874.

*To all whom it may concern:*

Be it known that we, WILLIAM J. RICHARDSON and EMILE DAUPHINOT, of Brooklyn, in the county of Kings and State of New York, have invented an Improvement in Funnel-Strainers, of which the following is a specification:

Funnels have been made with strainers fitted permanently within them, and in some cases the funnel has been hinged to the strainer. In the first-named case, the funnel and strainer are not capable of separate use, and in the second case they cannot be separated for use; but when the funnel alone is used, the strainer, hanging at one side, is liable to tip the bottle or vessel over, and when the strainer alone is used, the funnel, hanging to the same, is very much in the way.

Our invention relates to a clasp-handle and catch applied to a strainer, whereby said strainer can be easily and firmly connected to a funnel, or can be instantly removed, and the clasp forms a handle for holding the strainer.

In the drawing, Figure 1 is a vertical section of the strainer and funnel together. Fig. 2 is an elevation of the same; and Fig. 3 is a section of the strainer separately.

The funnel is of ordinary construction, with the inverted cone $a$, tube $b$, and handle $c$.

The strainer is made either concave or conical, as at $d$, of perforated sheet metal, or any other suitable material, and it is provided with a rim, $e$, of sheet metal, that may be strengthened by a wire, and this rim is annular and of a size corresponding, or nearly so, to that of the top of the funnel, so as to rest upon the same when the two are together. At one side of the rim $e$ are one or two hooks or claws, $i$, to catch beneath the wire or top edge of the funnel $a$, and on the other side of the rim $e$ the handle $f$ is attached. This handle $f$ is so shaped that it becomes also a clasp, and catches over the handle $c$ of the funnel when the parts are pressed together, and the spring of the metal is sufficient to hold the parts together when used jointly; and in taking hold of the handle of the funnel, the handle of the strainer is simultaneously grasped, and when it is desired to use the strainer separately the same can be removed, the spring of the clasp-handle allowing the parts to be disconnected. The spring-clasp $f$ forms the handle by which to hold the strainer when used separately.

We claim as our invention—

1. The strainer made with a spring-clasp handle, substantially as set forth, to connect the same with a funnel when required for joint use, as specified.

2. The strainer made with a spring-clasp at one side, and a hook or similar connection at the other, to hold the strainer to the funnel, as specified.

Signed by us this 19th day of August, 1874.

WILLIAM J. RICHARDSON.
  EMILE DAUPHINOT.

Witnesses:
  GEO. T. PINCKNEY,
  CHAS. H. SMITH.